United States Patent
Sandberg

[11] 3,773,385
[45] Nov. 20, 1973

[54] DEVICE FOR FACILITATING OF THE OPERATION OF AUTOMATICALLY OPERABLE PLATFORM WALLS OR GATES AT DUMP VEHICLES

[76] Inventor: Sven Alfred Sandberg, Stigarvagen 3, 5-611 00 Nykoping, Sweden

[22] Filed: July 10, 1972

[21] Appl. No.: 270,160

[52] U.S. Cl............ 298/23 MD, 49/340, 296/57 R
[51] Int. Cl............................................. B60p 1/26
[58] Field of Search.................. 298/23 MD, 23 R, 298/23 A, 23 B, 23 F, 23 S, 23 M, 22 D, 22 F; 296/57 R, 58; 49/340

[56] References Cited
UNITED STATES PATENTS
2,229,037   1/1941   Boldman........................... 298/1 V
3,173,724   3/1965   Sandberg........................... 298/23 B
3,235,310   2/1966   Medley........................... 298/23 MD
3,438,677   4/1969   Redpath........................... 298/1 V FOREIGN PATENTS OR APPLICATIONS
419,389   11/1934   Great Britain.................... 298/23 R Primary Examiner—Richard J. Johnson
Assistant Examiner—Reinhard Eisenzoff
Attorney—Karl W. Flocks

[57] ABSTRACT

This invention relates to improvements in the device for opening of body gates of dump trucks or the like described in U.S. Pat. No. 3,173,724. By hinging a separate flap-like element at the bottom at the body platform and pivotally connecting the link of the device according to said patent to said element the gate will be indirectly biassed by the link. The disadvantages of jamming gates is thereby eliminated.

4 Claims, 3 Drawing Figures

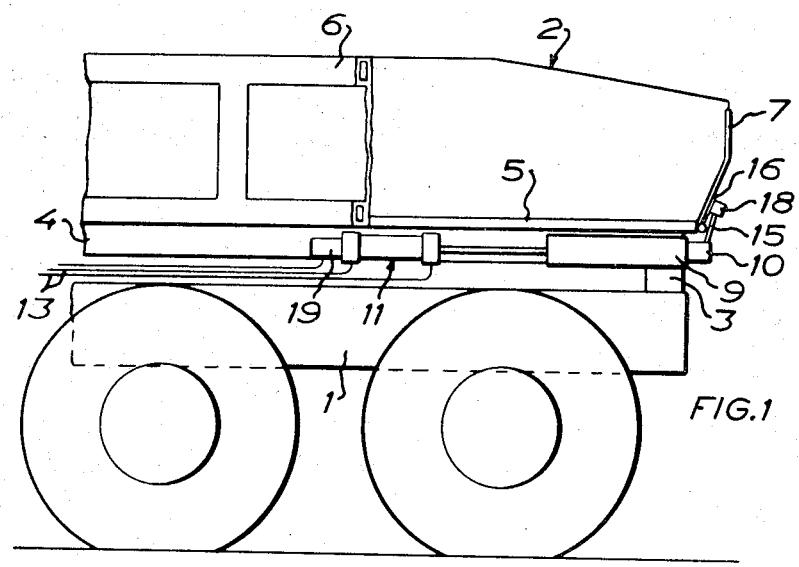
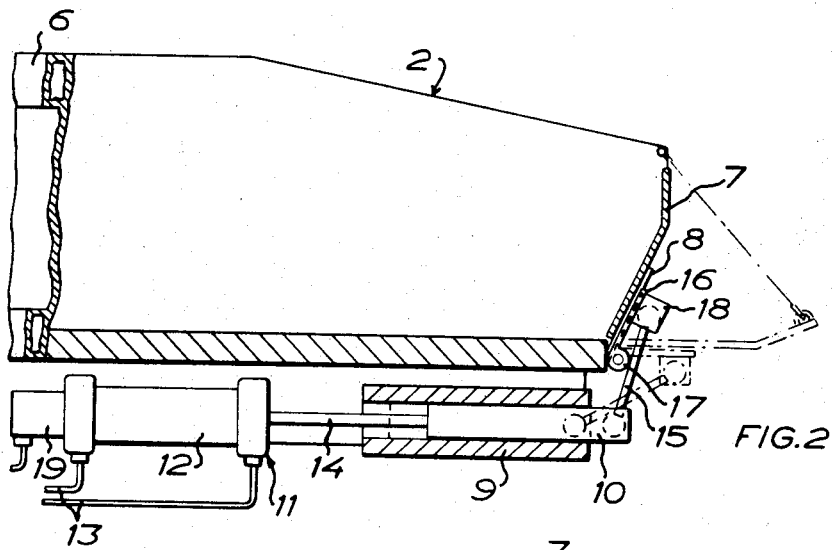
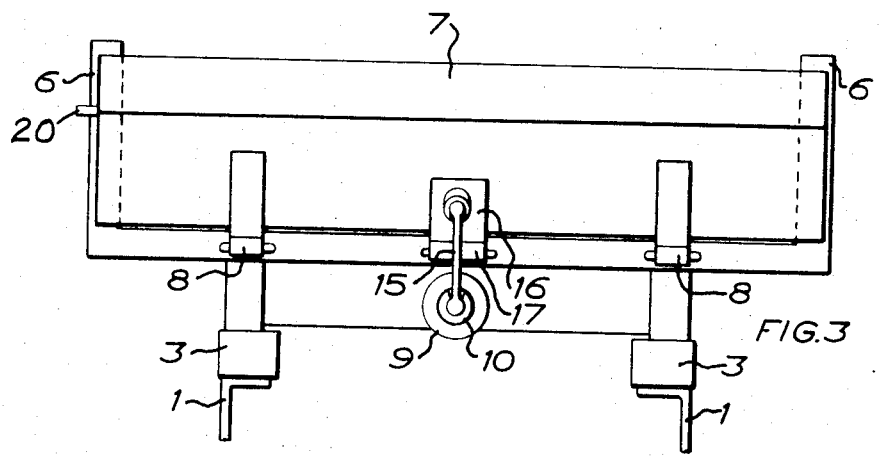

DEVICE FOR FACILITATING OF THE OPERATION OF AUTOMATICALLY OPERABLE PLATFORM WALLS OR GATES AT DUMP VEHICLES

My U.S. Pat. No. 3,173,724 discloses a device for opening and closing platform walls. This invention relates to improvements of the said device.

The tipping body or platform of today's dump vehicles has a considerable width and accordingly the tail or end gate has a considerable length. Known gates are connected to the body by three or more hinges. When loading rocks it often occurs that heavy pieces of rock strike the closed gate or slide down against the same and the result is that the gate is bent or deformed. To function properly three or more hinges must be aligned, but on a deformed gate the hinges are out of alignment and the result is normally that the gate jams. The problem is of minor importance when the gate is to be opened, as the load pushes it open even if the resistance is great, but on closing a jamming gate the strain on the mechanism is considerable. At vehicles having the mechanical actuating means according to U.S. Pat. No. 3,173,724 the weight of the body being lowered biasses the actuating means which can result in damages at the actuating mechanism, the gate or even on the operating mechanism.

One object of this invention is to provide a device which eliminates the risk for jamming at the tailgate.

When a smooth function of the tailgate is ensured the forces necessary for opening and closing the same can be reduced and accordingly the mechanical actuating mechanism can be replaced by a less cumbersome mechanism such as a pneumatically or hydraulically operated cylinder and piston arrangement or an electrically operated mechanism.

When a tipping body vehicle is used for spreading sand or gravel there often is a demand for an apparatus which spreads the sand, i.e., throws it some distance away from the vehicle.

Another object of this invention is to provide a device for vehicles having a tailgate of the above mentioned type, which device makes it possible to use the vehicle for sanding purpose.

The main characteristic feature of this invention lies in that at the tailgate of the dump body a flap-like element is hingedly connected to the tail end of the body, the axis of said element being in line with the common axis of the hinges of the gate, and that the link, one end of which is pivotally connected to the outer end of the plunger, is pivotally connected to said flap-like element, the flap-like element in the closed position of the gate acting as an additional hinge and supporting the gate and in cooperation with the operating means locking the same and wherein in one direction of movement of the plunger the link swings the flap-like element outwardly and downwardly to release the gate and in the other direction of movement of the plunger the link via the flap-like element swings the gate toward its closed position and in the outermost position of the plunger locks the body gate.

The nature of the invention will become apparent from the following description taken in conjunction with the annexed drawing, wherein FIG. 1 is a fragmentary side elevational view of the rear part of the chassis and the body of a dump truck, having a gate according to this invention;

FIG. 2 is a fragmentary view in section of the rearmost portion of FIG. 1 in a larger scale; and FIG. 3 is an end view of the end gate also in a larger scale.

On the drawing reference 1 indicates the chassis of the dump truck. The rear end of a tipping body 2 is supported by pivot bearings 3 so that the body can be tipped rearwardly. The mechanism for the tipping motion is no part of this invention and consequently is not described. The tipping body 2 has a frame structure 4, a bottom 5 and side walls 6, the nearer one partly broken away on the drawing. At the rear end of the body there is a gate 7 with two hinges 8, FIG. 3, and the gate can be swung rearwardly and downwardly from the shown slightly rearwardly inclined position to a vertical position. A guiding sleeve 9 is secured to the frame structure 4 or bottom 5 of the body 2 and in said sleeve a plunger 10 is slidably received. At a distance from the sleeve 9 a pneumatically or hydraulically operable cylinder and piston arrangement 11 is secured to the frame structure 4 and the cylinder 12 is controlled via pipings or hoses 13 and a control valve, not shown, preferably placed at the driver's seat, connected to a source of pressure medium, such as a pump, a compressor or a pressure tank. The piston rod 14 of the arrangement 11 is connected to one end of the plunger 10 and the piston accordingly pulls the plunger inwardly and pushes it outwardly respectively on actuating the cylinder and piston arrangement 11. The opposite or rear end of the plunger 10 is pivotally connected, preferably over a ball-joint, to a link 15.

On the outside of the gate there is arranged a flap-like element 16, which is pivotally connected to a hinge means 17 aligned with the two hinges 8 of the gate. A projection 18, preferably in the form of female part of a ball-joint is secured to the flap-like element and the above mentioned link 15, which preferably has the male part of said joint, is pivotally connected thereto.

When the plunger 10 is pulled inwardly by the piston rod 14 the link 15 swings the flap-like element downwardly to release the gate. The gate 7 will then open automatically due to gravity or due to the load acting against its inside. When the gate is to be closed the plunger 10 is pushed the other way by the piston rod 14 and the link swings the flap-like element 16 upwardly and the latter pushes or swings the gate 7 towards its closed position. In the preferred embodiment a vibrator means 19, e.g. of such a type which is used in pneumatic hammers or the like, is coupled to the cylinder and piston arrangement 11. Upon activating said means, which takes place when the gate 7 is retained in an almost horizontal position by means of a pair of chains temporarily affixed between the outer edge of the gate and the upper rear corners of the side walls, as indicated in dash-dot lines in FIG. 2, the flap-like element 16 will be pushed upwardly momentarily and then retracted. The gate 7 will then quickly swing upwardly and then fall down so that the chaims are tightened. Gravel or sand which falls onto the gate as the body is tipped, will then be thrown away from the gate and spread over a considerable area.

For alerting the driver of the vehicle as to whether the gate 7 is open or closed, an index pin 20 is fixedly secured on gate 7 so as to extend laterally therefrom on the driver's side. The index pin 20 is painted a readily noticeable color, red for example, so that the driver may easily spot it by looking into the rear view mirror to determine the position of the gate 7.

The vibrator means and the control valve arrangement for the same are in and per se known and are not parts of this invention. It has accordingly not been regarded as necessary to explain said parts in details. It is obvious that the vibrator means also can be otherwise localized.

What is claimed is:

1. In a vehicle having a chassis, a tipping body comprising bottom platform and walls mounted for tipping movement on said chassis, means for tipping said body into dumping position and for lowering the same, and at least one movable gate hinged to said bottom platform of said tipping body, actuating means on said body, means on said chassis arranged to bias said actuating means, operating means mounted on said body and connected with said actuating means and with said movable gate to open and close the same, wherein the operating means includes a sleeve fixedly mounted on said body, a plunger slidably received in said sleeve for axial movement therein, means connecting said plunger at one end thereof with said actuating means, and a link pivotally connected to the other end of said plunger and engaging said body gate, said link engaging said body gate being pivotally connected to a flap-like element hinged to said bottom platform of the body, the axis of said element being parallel to the axis of the gate hinges, said flap-like element being arranged in the closed position of the gate to support the gate like a hinge.

2. In a vehicle having a chassis, a tipping body comprising bottom platform and walls mounted for tipping movement on said chassis, means for tipping said body into dumping position and for lowering the same, and at least one movable gate hinged to said bottom platform of said tipping body, actuating means on said body, means on said chassis arranged to bias said actuating means, operating means mounted on said body and connected with said actuating means and with said movable gate to open and close the same, wherein the operating means includes a sleeve fixedly mounted on said body, a plunger slidably received in said sleeve for axial movement therein, means connecting said plunger at one end thereof with said actuating means, and a link pivotally connected to the other end of said plunger and engaging said body gate, and wherein the link engaging said body gate is pivotally connected to a flap-like element hinged to said bottom platform of the body, said actuating means being constituted by a pneumatically or hydraulically operable cylinder and piston arrangement, the piston rod being connected to the plunger slidably received in the sleeve and said means on the chassis arranged to bias the said actuating means being a pump or compressor.

3. In a vehicle having a chassis, a tipping body comprising bottom platform and walls mounted to tipping movement on said chassis, means for tipping said body into dumping position and for lowering the same, and at least one movable gate hinged to said bottom platform of said tipping body, actuating means on said body, means on said chassis arranged to bias said actuating means, and operating means mounted on said body and connected with said actuating means and with said movable gate to open and close the same, wherein the operating means includes a sleeve fixedly mounted on said body, a plunger slidably received in said sleeve for axial movement therein, means connecting said plunger at one end thereof with said actuating means, and a link pivotally connected to the other end of said plunger and engaging said body gate, said actuating means being constituted by a pneumatically or hydraulically operable cylinder and piston arrangement, the piston rod being connected to the plunger slidably received in the sleeve and said means on the chassis arranged to bias the said actuating means being a pump or compressor.

4. In a vehicle having a chassis, a tipping body comprising bottom platform and walls mounted for tipping movement on said chassis, means for tipping said body into dumping position and for lowering the same, and at least one movable gate hinged to said bottom platform of said tipping body, actuating means on said body, means on said chassis arranged to bias said actuating means, operating means mounted on said body and connected with said actuating means and with said movable gate to open and close the same, wherein the operating means includes a sleeve fixedly mounted on said body, a plunger slidably received in said sleeve for axial movement therein, means connecting said plunger at one end thereof with said actuating means, and a link pivotally connected to the other end of said plunger and engaging said body gate, and wherein the link engaging said body gate is pivotally connected to a flap-like element hinged to said bottom platform of the body, and the actuating means is constituted by a pneumatically or hydraulically operable cylinder and piston arrangement, the piston rod of which is connected to the plunger slidably received in the sleeve and the means on the chassis arranged to bias the said actuating means includes a pump or compressor, said actuating means further including a vibrator means, adapted to vibrate the gate when being used for sand spreading purpose.

* * * * *